J. GORDON, Jr. & A. W. STRINGHAM.
CONTROL FOR MECHANICAL SOUND PRODUCERS.
APPLICATION FILED AUG. 13, 1910.

1,106,446.

Patented Aug. 11, 1914.
2 SHEETS—SHEET 2.

Witnesses:
Fred K. M. Dannenfelser
Chas. Pearl

John Gordon Jr. Inventors
Albert W. Stringham
By his Attorneys

UNITED STATES PATENT OFFICE.

JOHN GORDON, JR., OF EAST ORANGE, NEW JERSEY, AND ALBERT W. STRINGHAM, OF BROOKLYN, NEW YORK.

CONTROL FOR MECHANICAL SOUND-PRODUCERS.

1,106,446.   Specification of Letters Patent.   Patented Aug. 11, 1914.

Application filed August 13, 1910. Serial No. 577,011.

*To all whom it may concern:*

Be it known that we, JOHN GORDON, Jr., and ALBERT W. STRINGHAM, citizens of the United States, residing at East Orange, Essex county, New Jersey, and Brooklyn, Kings county, New York, respectively, have invented certain new and useful Improvements in Control for Mechanical Sound-Producers, of which the following is a full, clear, and exact description.

Our invention relates to improvements in alarm signals particularly useful when applied on motor vehicles. In the particular form shown, the invention is of a type adapted to a motor bicycle, the arrangement being such that the rider may easily manipulate the same to operate the signaling device whenever desired.

The object of our invention is to provide a simple, comparatively light and compact structure which may be readily adapted to either a right or left hand drive and is capable of easy application, and in which the signaling device may be quickly started and stopped to permit prompt alarm and yet avoid unnecessary alarm.

Figure 1:
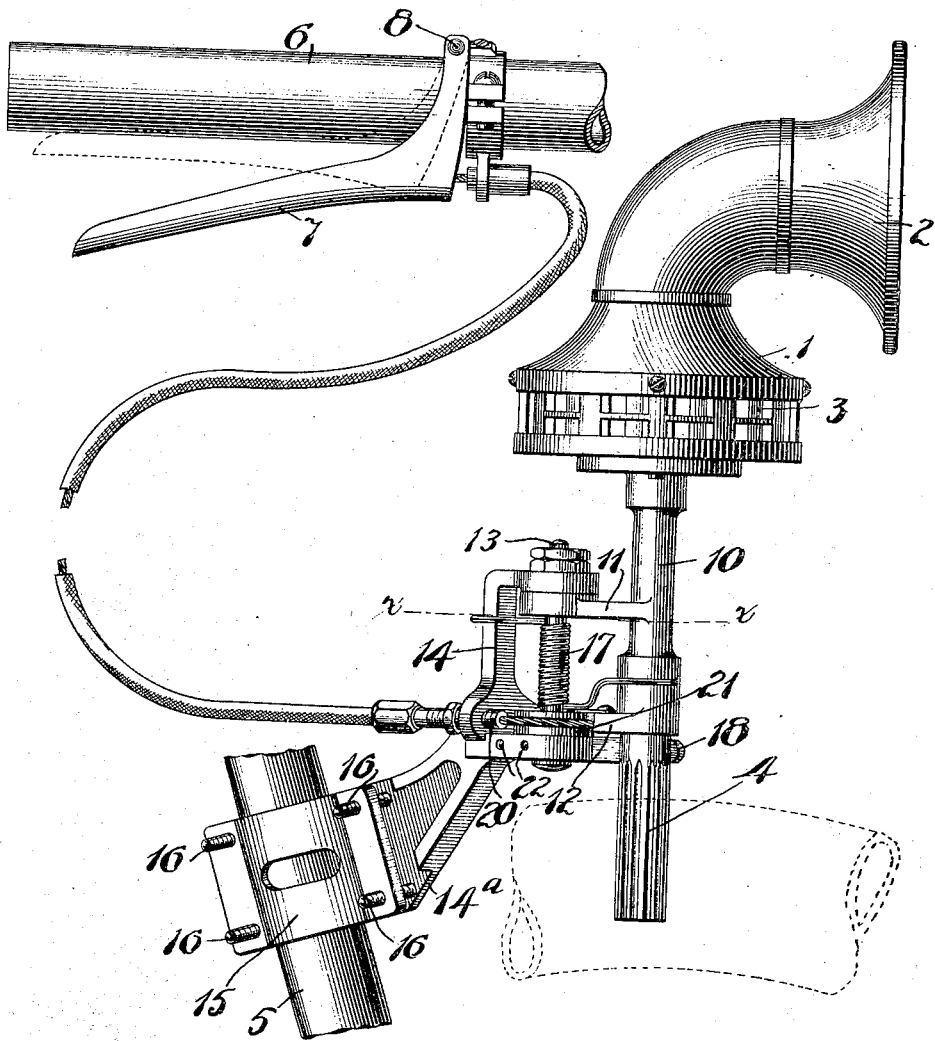
Figure 2:
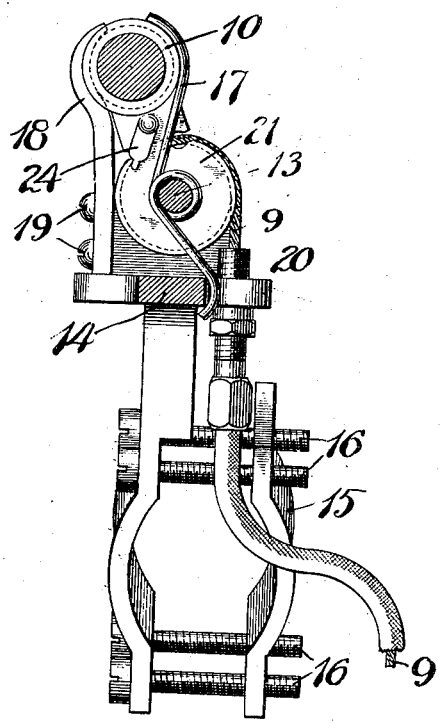
Figure 3:
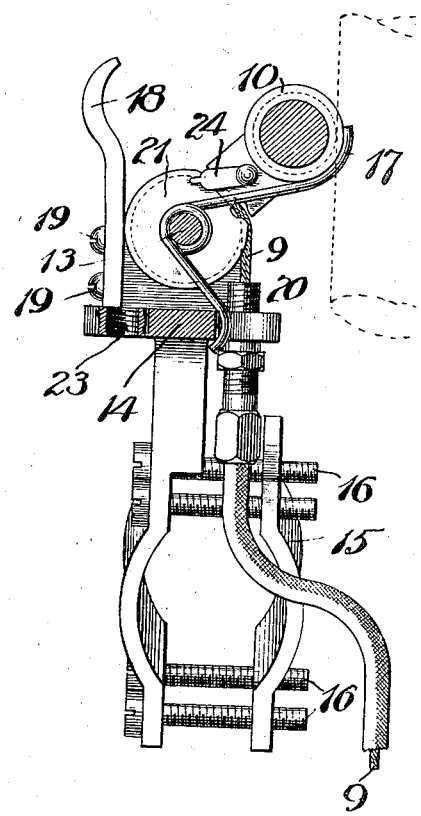
Figure 4:
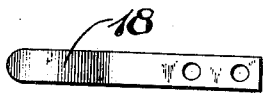

In the drawings Figure 1 is a side elevation of our improved signaling device showing parts of a motor bicycle associated therewith to illustrate the relative arrangement of the parts. Fig. 2 is a horizontal section on the plane of the line $x$—$x$ of Fig. 1, looking down and showing the device in its idle position. Fig. 3 is a similar view showing the device in the position of operation. Fig. 4 is a detail view.

1 represents the main body of the case of a signaling device. In this instance said body carries a magnifying horn 2 facing forwardly. The sound producing element is what may be termed a rotor 3, arranged within the main body of the case 1 and driven by a shaft or spindle, the lower end of which is indicated at 4. This lower end 4 is provided with some suitable friction contact surface. In this particular instance the contact surface is formed by providing longitudinal grooves in the external surface of that part of the shaft which is to engage with the moving element of the vehicle, which, in this particular instance may be a tire, as indicated in dotted outline Figs. 1 and 3.

The parts thus far described are mounted upon a suitable bracket, which will later be described. This bracket is provided with a suitable clamping part, which enables it to be readily secured to a part of the frame of the vehicle. Ordinarily in a motor bicycle it will be found convenient to apply the device to the front fork, a part of which is indicated at 5, Fig. 1. 6 represents another part of the bicycle, in this instance, for example, a part of the handle bar. On this handle bar is suitably mounted a movable alarm operating handle 7, pivoted at 8, and having connected thereto a suitable cord 9. The arrangement is such that when the operating handle 7 is pressed toward the handle bar 6, the cord will swing certain of the parts so that the friction face 4 will engage with the side of the tire, as shown in Fig. 3, thereby rapidly rotating said shaft 4 and rotor 3 so as to produce the sound.

10 is a sleeve support for the shaft 4. In this instance the case 1 is also secured to the upper end of the sleeve 10. The sleeve 10 has two offset arms 11—12, which are concentrically mounted on a pivot 13. This pivot is carried by a bracket 14, which in turn has an extension 14ª, one side of which constitutes part of the clamp, the other member of the clamp being indicated at 15 and being held by screws 16—16.

17 is a spring which is so associated with the bracket 14 and the sleeve 10 as to move the same in a direction to disengage the friction end 4 from the tire, in other words, to move it back from the position indicated in Fig. 3 to that indicated in Fig. 2.

18 is a combined back stop and brake, the same being preferably adjustably secured to the base of the bracket 14 by screws 19—19. In the several figures this brake is shown on the left hand side of the bracket, looking down, so that the apparatus may be attached to the left hand side of the motor bicycle. In this arrangement, the cord 9 is shown as passing through an adjustable bushing 20 arranged on the opposite side of the base of the bracket 14.

21 represents a wheel or pulley carried on the pivot 13 around which the end of the cord 9 passes, so that sufficient pressure on the handle 7 will shift the parts from the position indicated in Fig. 2 to the position indicated in Fig. 3.

On the opposite side of the base of the bracket are screw-holes 22 to permit the combined back stop and brake 18 to be shifted to the opposite side of the bracket. So also (as shown in section in Fig. 3) that side of the base of the bracket shown as supporting the brake, is provided with a threaded passage 23 to receive the bushing 20, so that the direction of pull may be reversed. The spring 17 is also reversible so as to apply its pressure in a direction opposite to that shown in Fig. 2. By reversing these parts, namely, the back stop 18, the bushing 20 and the spring 17, the apparatus is readily adapted to the opposite side of the vehicle.

24 is a pawl, which is arranged to make adjustable connection with the wheel 21, suitable receiving recesses being provided in said wheel to receive said pawl 24 for the sake of simple and convenient adjustment.

What we claim is:

1. In an alarm device, the combination of a bracket having a clamp member extending therefrom, a pivot pin carried by said bracket, a sleeve provided with an arm extending therefrom and journaled on said pivot pin, an alarm spindle journaled in said sleeve, a combined back stop and brake extending from said bracket and lying in the arc of swing of said alarm spindle, a spring carried by said bracket and engaging said sleeve to normally swing it in a direction to bring said alarm spindle in engagement with said back stop and brake, and a manually controlled device adapted to swing said sleeve and spindle in the opposite direction and against the force of said spring.

2. In an alarm device, the combination of a bracket having a clamp member extending therefrom, a pivot pin carried by said bracket, a sleeve provided with an arm extending therefrom and journaled on said pivot pin, an alarm spindle journaled in said sleeve, a spring carried by said bracket and engaging said sleeve to normally swing it and its spindle in one direction, a pulley journaled on said pivot pin and connections between said pulley and said sleeve whereby rotation of said pulley may swing said sleeve and alarm spindle in the opposite direction and against the force of said spring, and a flexible operating band wrapped around said pulley.

3. In an alarm device, the combination of a bracket having a clamp member extending therefrom, a pivot pin carried by said bracket, a sleeve provided with an arm extending therefrom and journaled on said pivot pin, an alarm spindle journaled in said sleeve, a back stop and brake adapted to be detachably secured to and extend from opposite sides of said bracket to lie in the arc of swing of said alarm spindle, a reversible coiled spring encircling said pivot pin and having its ends engaging respectively said bracket and said sleeve and normally tending to swing said sleeve in one direction, a pulley journaled on said pivot pin, a pawl connecting said pulley with said sleeve to swing the same therewith, and manually operable means for rotating said pulley to swing said sleeve in a direction opposed to the force of said spring.

4. In an alarm device, the combination of a bracket, an arm pivoted thereto, a sleeve carried by the projecting end of said arm, an alarm spindle journaled in said sleeve, a pulley journaled concentrically with the pivotal axis of said arm and connected with the latter, whereby rotation of said pulley will swing said sleeve and alarm spindle, a flexible operating band wrapped around said pulley and a guide on said bracket for said band.

5. In an alarm device, the combination of a bracket, a pivot pin carried by said bracket, a sleeve provided with an arm journaled on said pivot pin, an alarm spindle journaled in said sleeve, a reversible spring carried by said bracket and adapted to be mounted in positions to swing said sleeve in one direction or the other about said pivot pin, a pulley journaled on said pivot pin and connected with said sleeve whereby rotation of said pulley will swing said sleeve, a flexible operating band adapted to be wrapped around said pulley in either direction so that a tension on said band will swing said pulley in one direction or the other against the force of said spring, and means on said bracket for guiding said band, said means being adjustable to positions for guiding said band when wrapped in either direction upon said pulley.

JOHN GORDON, Jr.
ALBERT W. STRINGHAM.

Witnesses:
R. C. MITCHELL,
RALPH C. POWELL.